United States Patent [19]

Gamble

[11] 3,742,243
[45] June 26, 1973

[54] PULSE GENERATOR
[75] Inventor: John G. Gamble, Simsbury, Conn.
[73] Assignee: Veeder Industries, Inc., Hartford, Conn.
[22] Filed: Sept. 27, 1971
[21] Appl. No.: 183,945

[52] U.S. Cl.................. 307/106, 73/519, 324/171
[51] Int. Cl. ............................................ G01p 3/48
[58] Field of Search................. 73/518, 519, DIG. 3; 324/70; 307/106; 324/168, 171, 174; 335/56, 92, 97

[56] References Cited
UNITED STATES PATENTS
2,512,325  6/1950  Hansen ............................ 73/DIG. 3
3,170,323  2/1965  Kuhrt et al....................... 73/DIG. 3
3,317,829  5/1967  Kuhrt et al...................... 324/174 X FOREIGN PATENTS OR APPLICATIONS
893,986    4/1962  Great Britain...................... 324/174

Primary Examiner—Robert K. Schaefer
Assistant Examiner—William J. Smith
Attorney—John M. Prutzman et al.

[57] ABSTRACT

A rotary pulse generator having a magnetic readout head with a Hall sensor and a rotor cooperable with the readout head for applying an alternating magnetic field to the Hall sensor for producing an electrical signal for each predetermined increment of angular displacement of the rotor. In one version the rotor comprises a pair of spaced coaxial magnet rings providing in an axial gap therebetween an annular alternating magnetic field to be applied to the Hall sensor as the rotor rotates. In other versions, the magnetic readout head employs a bistable magnetic shunt which cooperates with equiangularly spaced teeth or poles of the rotor for applying an alternating magnetic field to the Hall sensor as the rotor rotates.

14 Claims, 11 Drawing Figures

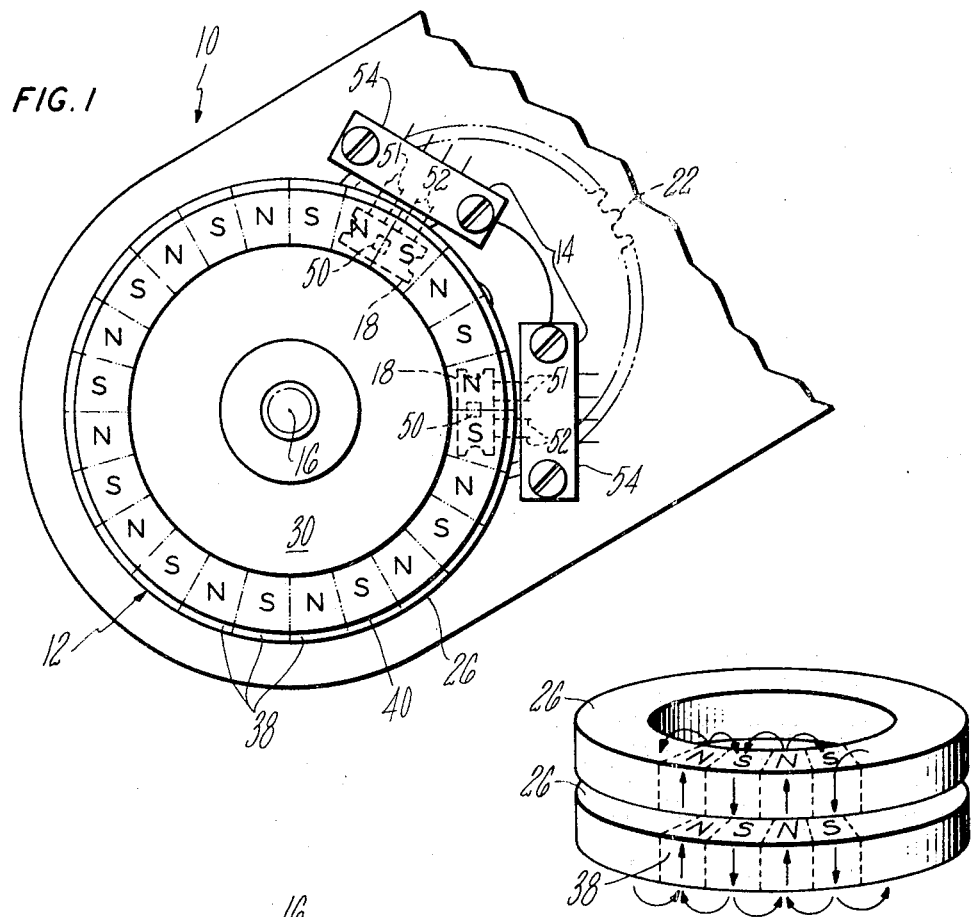
FIG. 1
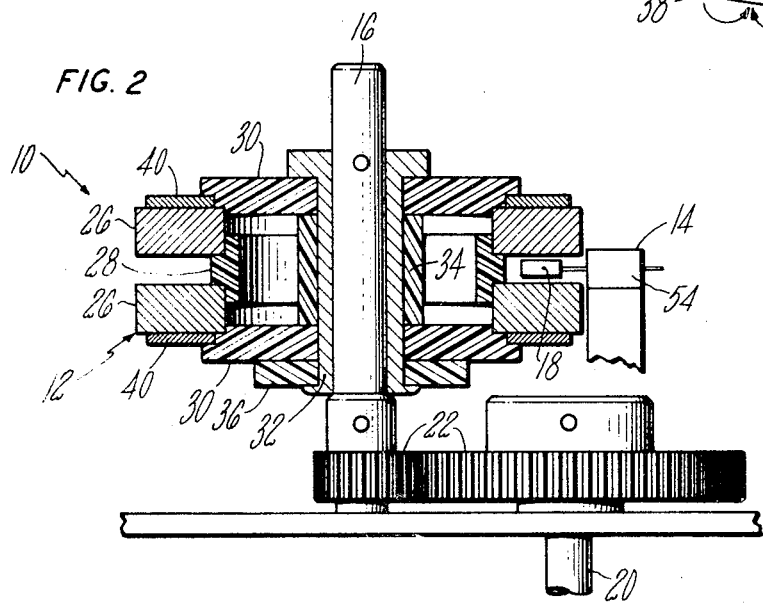
FIG. 2
FIG. 3
INVENTOR
JOHN G. GAMBLE
BY *Ralph H. Chilton*
ATTORNEY

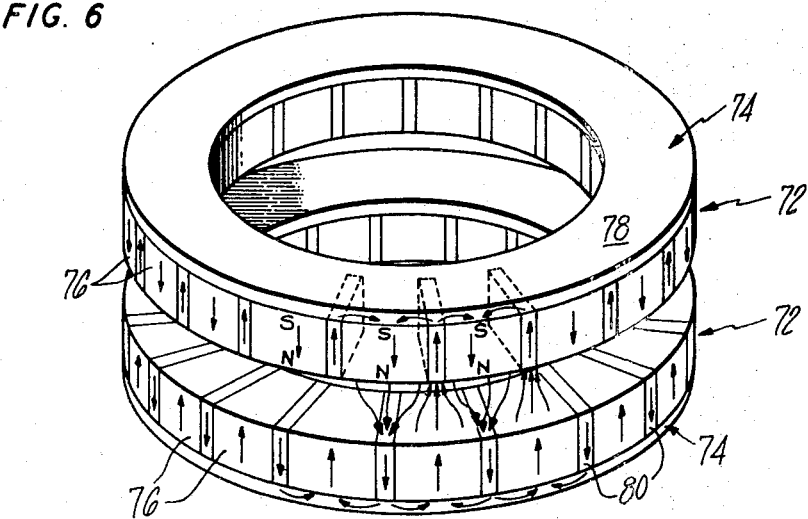
FIG. 6
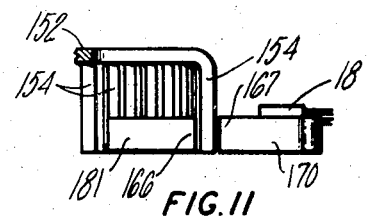
FIG. 11
FIG. 10
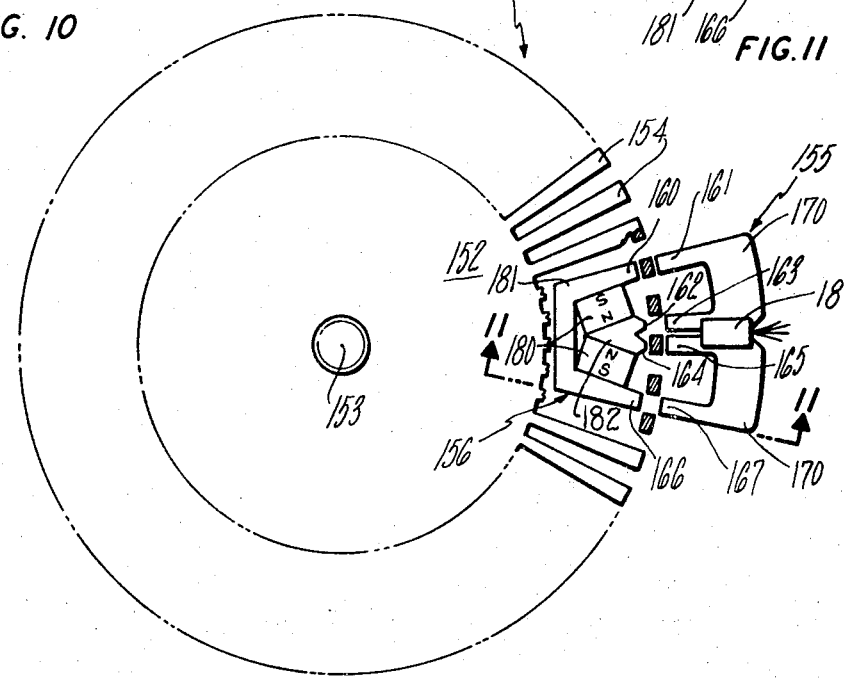

PULSE GENERATOR

BRIEF SUMMARY OF THE INVENTION

The present invention generally relates to pulse generators operable for generating an electrical pulse or signal for each predetermined increment of relative displacement between two relatively movable parts.

It is principal aim of the present invention to provide a new and improved rotary pulse generator operable for producing an electrical signal for each predetermined increment of angular displacement of its rotary input.

It is another aim of the present invention to provide a new and improved relative displacement pulse generator operable to produce an electrical signal for each predetermined increment of relative displacement of the parts irrespective of their rate of relative movement.

It is another aim of the present invention to provide a new and improved relative displacement pulse generator useful in determining the relative position of relatively movable parts.

It is a further aim of the present invention to provide a new and improved relative displacement pulse generator employing a Hall sensor as a pickup element for sensing relative displacement of relatively movable parts.

It is another aim of the present invention to provide a new and improved relative displacement pulse generator for generating a signal for each predetermined very small relative displacement of two relatively movable parts.

It is a further aim of the present invention to provide a new and improved pulse generator useful in fluid dispensing apparatus in combination with fluid meter for generating a pulse train with a pulse for each predetermined increment of fluid dispensed.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIG. 1 is a plan view, partly broken away, of a pulse generator incorporating a first embodiment of the present invention; and showing the magnetism of a permanent magnet ring theory;

FIG. 2 is a section view partly broken away and partly in section of the pulse generator of FIG. 1;

FIG. 3 is a reduced perspective view of a pair of rotor permanent magnet rings of the pulse generator of FIG. 1 and showing the magnetism thereof;

FIG. 6 is a perspective view of a pair of alternative magnet rings for the pulse generator of FIG. 1;

FIG. 10 is a plan view, partly broken away and partly in section, of a pulse generator incorporating a fourth embodiment of the present invention; and FIG. 11 is a partial section view, partly broken away and partly in section, taken substantially along line 11—11 of FIG. 10.

DESCRIPTION OF THE PREFERRED EMBODIMENTS

Figure 4:
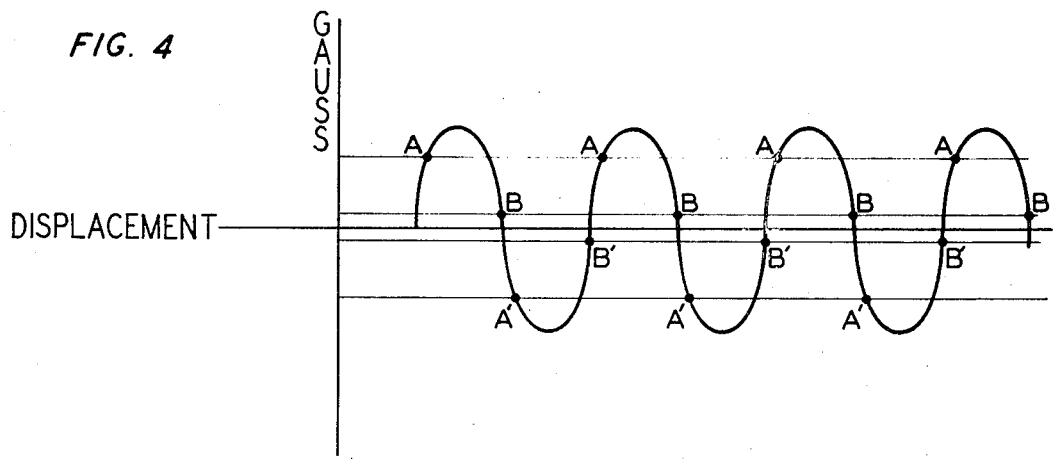
FIG. 4 is a graph illustrating the alternating magnetic field between the rotor magnet rings.

Referring now to the drawings in detail wherein like numerals represent like parts throughout the several figures, and referring particularly to FIGS. 1–4, a pulse generator 10 incorporating an embodiment of the present invention comprises a spool-like rotor 12 and a pickup or readout assembly 14 with a pair of pickups 18. A shaft 16 of the rotor 12 is connected to be driven by an input shaft 20 through suitable gearing 22.

The rotor 12 comprises a pair of coaxial annular permanent magnets 26, an inner spacer ring 28 for maintaining the magnets 26 in a predetermined axially spaced relationship with a relatively small axial gap therebetween and a pair of end plates 30 for supporting the magnets 26 coaxially on a hub 32. A spacer sleeve 34 is mounted on the hub for spacing and securing the end plates 30 to the hub 32, and an end washer 36 is placed on the hub and one end of the hub 32 is flared outwardly onto the washer 36 to secure the rotor parts together. The aforementioned rotor parts excepting for the permanent magnets 26 are made of plastic, aluminum or other suitable nonmagnetic material.

The permanent magnets 26 are formed by a single piece of ceramic or other suitable permanent magnet material preferably having a high coercive force and are premagnetized to form a plurality of substantially equiangularly spaced axially extending permanent magnets 38 having alternating polarity. As shown in FIG. 3 the two coaxial magnets 26 are angularly related with their opposed individual magnets 38 in substantial magnetic and axial alignment and such that a ring of flux field columns of alternating direction are produced between the magnets 26. Annular ferromagnetic caps or rings 40 of high permeability are provided in the outer axial faces of the magnets 26 (and held in place by the end plates 30) to provide a low reluctance flux path between adjacent individual magnets 38. Accordingly the magnets 26 and ferromagnetic caps 40 together provide a pair of axially spread ring magnets with a plurality of generally oval or racetrack shaped highly efficient magnetic circuits which are individually composed of four magnets 38 and a minimum air gap (which is preferably held to a minimum) resulting from the ring magnet spacing. The stray or flux leakage paths from the magnetic circuits are minimal and discrete and dense flux columns are provided across the signal gap between the ring magnets.

Each pickup 18 employs a Hall sensor (which may be only approximately 0.010 in. square) which for example forms a part of a solid state chip 50 providing a magnetically operated solid state switch or digital threshold device (to which D.C. power is supplied via connector pin leads 51) that is operable to generate an electrical pulse or signal (via a pair of connector pin leads 52) upon the application of an appropriate flux field (having an intensity, etc., determined by the design of the solid state switch 50) to the Hall sensor. A receptacle 54 for the connector pins 51, 52 is provided for mounting each pickup 18 in position between the permanent magnets 26, and for making electrical connections to the pickup 18 for supplying D.C. power to the pickup and for receiving the pulse train generated by the pickup.

For example, the 2SS1 Solid State Switch made by Honeywell, Inc. and comprising a Hall sensor, trigger, and amplifier and formed by a single silicon integrated circuit may be used for this purpose. More particularly, the Honeywell 2SS1 switch, being unidirectional, requires that the magnetic field be in an appropriate direction to generate a pulse and "closes" to initiate a pulse or signal when the flux density on its Hall sensor reaches a maximum threshold of approximately 750 gauss and "opens" to terminate the pulse or signal when the flux density falls to a minimum threshold of approximately 100 gauss.

The pickups 18 are mounted with the Hall sensor of the switch 50 lying between the axially spaced permanent magnets 26 and such that the relatively high intensity flux field columns between the ring magnets are applied to the Hall sensor as the rotor 12 rotates. Consequently, as the rotor 12 rotates, the flux field passing through the Hall sensor varies and follows a generally sinusoidal wave form as shown by the graph in FIG. 4. Accordingly, for example, if the permanent magnets 26 are formed with 24 angularly spaced individual magnets 38, as shown in FIG. 1, the alternating magnetic field, between the ring magnets, has a 30° pitch and produces a flux reversal through the Hall sensor every 15° of rotation of the rotor 12. Referring to FIG. 4, the solid state switch 50 initiates an electrical pulse as at A and terminates the pulse as at B and if the switch 50, is designed to be operated by magnetic fields in both directions a signal will also be initiated and terminated at A' and B' respectively on the alternate half waves of the magnetic field to provide a substantially 15° signal pitch. Also, for example suitable logic circuitry (not shown) could be provided in combination with the switch 50 to produce separate relatively short width signals at each point A, A' (or B and B') and such that two substantially evenly spaced signals are provided for each 30' of rotation of the rotor 12 or at points A, B, A' and B' to provide four signals for each 30° of rotation.

Figure 5:
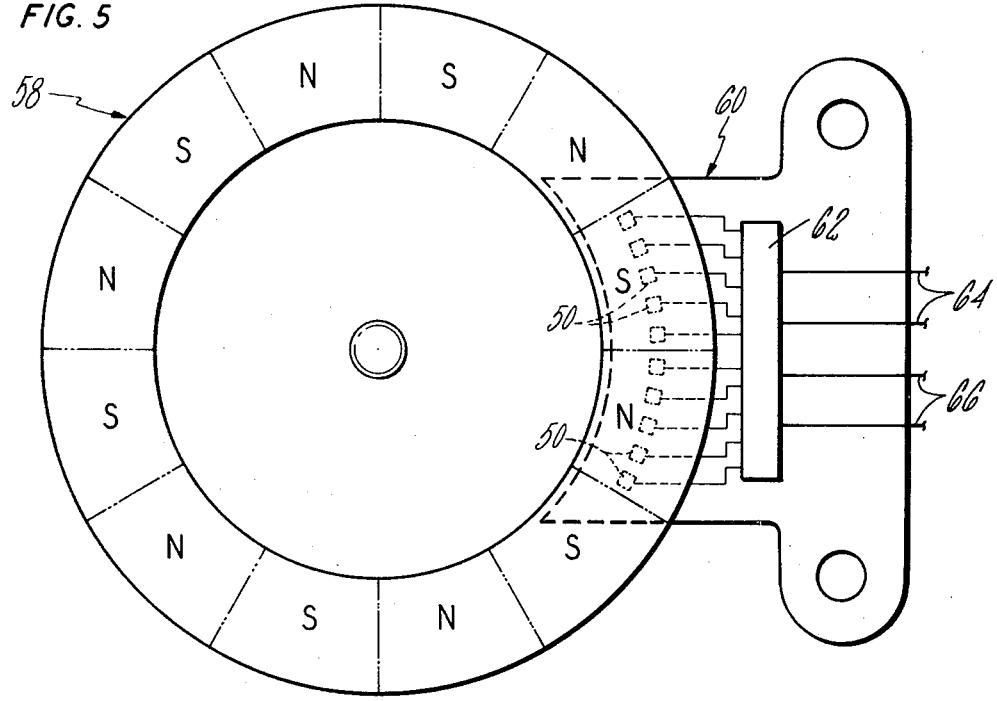
FIG. 5 is a partial plan view of a pulse generator incorporating a second embodiment of the present invention.

The two pickups 18 may be connected to a suitable pulse redundancy circuitry (not shown) for automatic pulse verification and elimination of stray pulses. Alternately the pickups 18 could be suitably connected in series to provide twice as many pulses for each predetermined angular increment of displacement of the rotor 12 for which purpose the pickups 18 would preferably be angularly spaced to provide equally spaced pulses. Similarly three or more suitably angularly spaced switches 50 could be provided for increasing the number of equally spaced pulses for each full rotation of the rotor 12. For example, as shown in FIG. 5 with a twelve pole rotor 58 a readout head 60 with ten solid state switches 50 (which preferably have the same "on" and "off" thresholds) could be employed for generating 60 equally spaced pulses for each revolution of the rotor 12. The Hall sensors of the switches 50 preferably have a total spacing less than the wave length of the sinusoidal alternating magnetic field to ensure that the Hall sensors are sequentially operated as the rotor 12 turns. Thus, with a unidirectional magnetic switch 50 and with twelve pole rotor 58 the ten switches 50 could be located such that their Hall sensors have an equiangular spacing of 6°. Also, the readout head 60 may have suitable solid state circuitry 62 for connecting the solid state switches 50 together for supplying a single pulse train to a single pair of outlet leads 64 and for supplying D.C. power to the solid state switches via a single pair of inlet leads 66.

Referring to FIG. 6, an alternative ring magnet 72 is shown comprising a castellated ferromagnetic ring 74 of preferably soft iron and a plurality of truncated separate permanent magnet segments 76. The castellated ring 74 is formed with an annular end plate 78 and a plurality of equiangularly spaced axially extending pole pieces 80 providing pockets therebetween for the permanent magnet segments 76. The size of the permanent magnet segments 76 is chosen to provide a magnetic field of adequate intensity and the thickness of the end plate 78 and pole pieces 80 is chosen to provide an adequate magnetic return path. Thus, as shown in FIG. 6 a pair of axially spaced generally magnetically aligned ring magnets 72 produce generally oval or racetrack shaped highly efficient magnetic circuits providing an annular alternating magnetic field across the air gap between the ring magnets 72. The design of the ring magnet 72 provides for the manufacture of separate permanent magnet segments 76 at the optimum size. Therefore, a larger number of individual magnets can be provided for any given ring magnet diameter to increase the pulse frequency or the ring magnet diameter can be made less for any given pulse frequency and in either event the rotor can be built more compact and with a substantially lower moment of inertia for any given pulse frequency.

Figure 9:
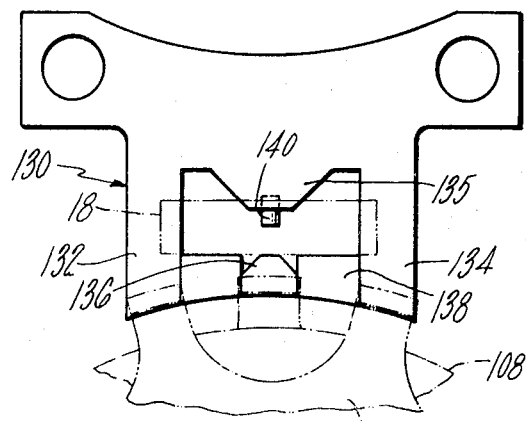
FIG. 9 is an enlarged plan view of a magnetic shunt assembly of the pulse generator of FIG. 7 additionally showing in phantom a pickup and a portion of a rotor of the pulse generator.
Figure 7:
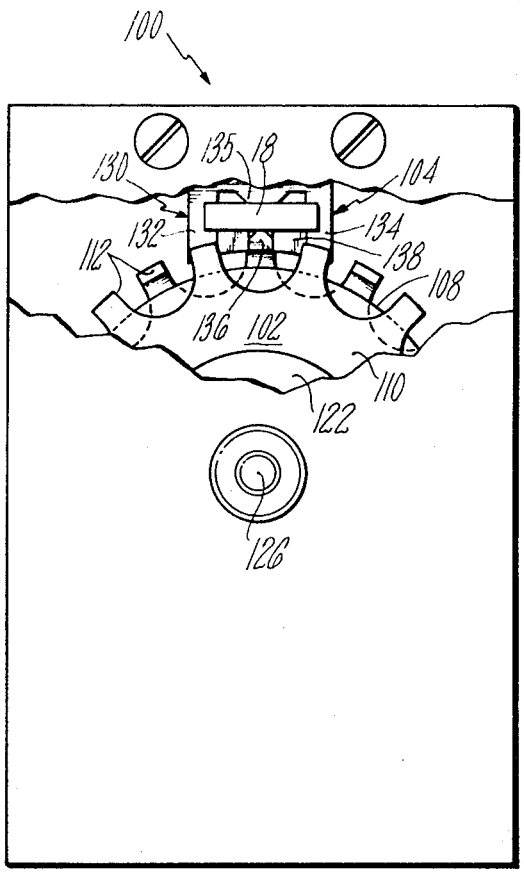
FIG. 7 is a plan view partly broken away of a pulse generator incorporating a third embodiment of the present invention.
Figure 8:
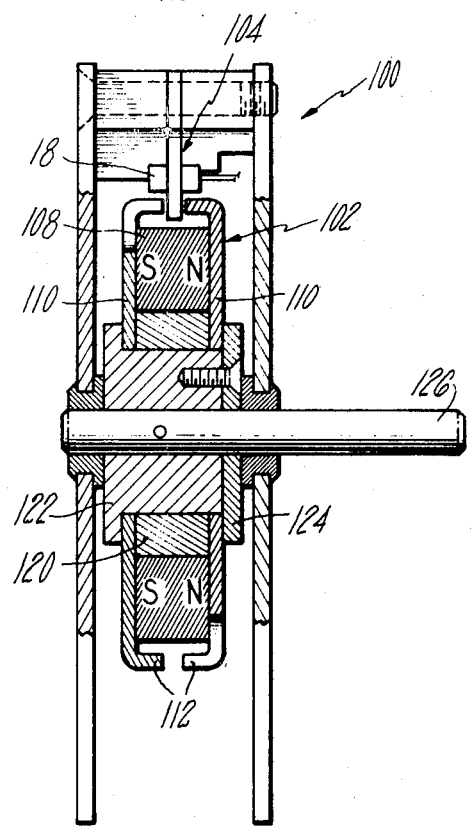
FIG. 8 is a section view partly broken away and partly in section of the pulse generator of FIG. 7.

Another embodiment 100 of a rotary pulse generator incorporating the present invention is shown in FIGS. 7, 8, and 9. The pulse generator 100 comprises a rotor 102 and a bistable readout head 104. The rotor 102 comprises a single annular permanent magnet 108 and a pair of pole or end plates 110, each having a scalloped perimeter and an annular arrangement of equiangularly spaced axially inwardly projecting peripheral poles 112. The permanent magnet 108 is axially magnetized such that the end plates 110 and their respective peripheral poles 112 have opposite polarity. The permanent magnet 108 is supported on a bushing 120 and the bushing 120 and pole plates 110 are supported on a hub 122 and secured in position by an end washer 124. The hub is affixed to an input or drive shaft 126.

The readout head 104 comprises a generally E-shaped ferromagnetic shunt 130 of soft iron and a pickup 18 with a solid state switch 50 (e.g., Honeywell 2SS1 Solid State Switch). The pickup 18 is mounted intermediate the outer legs on pole pieces 132, 134 of the shunt 130 and with its Hall sensor in alignment with and between the spaced center leg portions 135, 136 of the shunt 130. The outer center leg portion or pole piece 136 is formed by a soft iron plug in a brass bridge support 138 extending between the outer legs 132, 134 and the inner center leg portion 135 has a projecting soft iron pin 140 received within a recess in the pickup 18 in alignment with the Hall sensor to concentrate the flux field on the Hall sensor.

The angular spacing of the outer legs 132, 134 is substantially equal to the tooth or pole pitch of each end plate 110. Also, the two end plates 110 are angularly offset preferably substantially one-half the tooth pitch and such that the outer legs or pole pieces 132, 134 are aligned with the poles 112 of one of the end plates 110 when a pole 112 of the other end plate is aligned with the central leg portion or plug 136 of the shunt 130. In this position the magnetic circuit between the axial ends of the permanent magnet 108 comprises a pair of adjacent poles of one of the end plates 110, and the outer legs 132, 134 of the shunt 130 the inner leg 136 and a pole of the other end plate 110. The magnetic flux is therefore applied to the Hall sensor in one direction and as the rotor 102 rotates, the end plates 110 alternatively move into association with the outer legs 132, 134 and the central leg portion 136 respectively such that the magnetic field through the Hall sensor reverses as the rotor 102 rotates. The alternating magnetic field applied to the Hall sensor, therefore, has a generally sinusoidal wave form with rapid reversals. Also, the magnetic interaction of the rotor end plates 110 and the shunt 130 provides a detenting effect for restraining the rotor 102 against rotation and for thereby eliminating pulses due to rotor vibration or shock.

Additional readout heads 104 may be provided in combination with the rotor 102 to provide for redundancy verification or to provide a greater number of pulses for each revolution of the rotor 102. Also, with two or more readout heads 104, the readout heads can be spaced to reduce the net detenting effect as for example where it is desired to reduce the torque required for rotating the rotor.

Another embodiment 150 of a pulse generator incorporating the present invention is shown in FIGS. 10 and 11. The pulse generator 150 comprises a soft iron sheet metal rotor 152 mounted on a rotor shaft 153 and having a plurality of axially extending equiangularly spaced pole pieces or teeth 154, preferably having a circumferential width substantially equal to but slightly less than one-half the tooth pitch. A bistable magnetic readout head 155 and a permanent magnet assembly 156 and mounted in operative alignment on opposite radial sides of the rotor teeth 154. The readout head 155 and permanent magnet assembly 156 together provide four circumferentially spaced pairs of radially spaced stator poles 160, 161; 162, 163; 164, 165 and 166, 167. The permanent magnet assembly has a pair of permanent magnets 180 which are mounted in generally aligned magnetically opposed relationship between a U-shaped soft iron plate 181 (providing the poles 160, 166) and an inner soft iron plate 182 (providing the pole 162, 164) to make the two outer pole 160, 166 one polarity (e.g. South) and the two inner pole 162, 164 the opposite polarity (e.g. North).

The readout head 155 comprises a pickup 18 and a bistable magnetic circuit formed by two U-shaped soft iron plates 170. A first magnetic circuit through the Hall sensor of the pickup 18 is provided between the poles 161 and 165 and is made effective when rotor teeth 154 are positioned between and complete the magnetic circuit through the aligned poles 160, 161 and 164, 165. A second magnetic circuit through the Hall sensor of the pickup 18 is provided between the poles 167 and 163 and is made effective when the rotor teeth are positioned between and complete the magnetic circuit through the aligned poles 166, 167 and 162, 163. As shown in FIG. 10, the pole spacing is such that as the rotor 152 rotates, the magnetic circuit shifts between the pairs of poles 163, 167 and the pair of poles 165, 161, and as a result an alternating magnetic field is applied to the Hall sensor of the pickup 18 to generate a train of electrical signals or pulses and with a signal or pulse for each predetermined increment of angular displacement of the rotor 152.

The pulse generator of the present invention is adapted to provide an electrical pulse or signal for each predetermined increment of rotation of the pulse generator rotor. The pulse generator has notable application where high pulse frequency is desired, for example, as a shaft encoder or in connection with fuel dispensing equipment to provide a pulse for each very small increment of fuel delivered. Also, the present invention although shown and described in connection with rotary pulse generators could also be adapted to non-rotary applications, for example, to sense relative linear displacement.

As will be apparent to persons skilled in the art, various modifications, adaptations and variations of the foregoing specific disclosure can be made without departing from the teachings of the present invention.

I claim:

1. A pulse generator responsive to relative displacement along a predetermined path comprising magnetic field generator means having a first plurality of ferromagnetic poles along said predetermined path and a magnet pickup with a Hall sensor and operable upon the application of a magnetic field to the Hall sensor to generate an electrical signal, the Hall sensor and first plurality of ferromagnetic poles being mounted for relative movement along said predetermined path, the magnetic field generator means further comprising bistable magnetic circuit means associated with the Hall sensor adapted to be selectively magnetically switched to each of two alternative stable magnetic states respectively having substantially oppositely directed magnetic fields applied to the Hall sensor and operable by the ferromagnetic poles upon relative displacement of the Hall sensor and the ferromagnetic poles along said predetermined path to be switched back and forth between its two alternative stable magnetic states to apply an alternating magnetic field to the Hall sensor to operate the magnetic pickup to generate a train of electrical signals in accordance with such relative displacement.

2. A pulse generator according to claim 1 wherein the ferromagnetic poles are substantially equally spaced along said predetermined path and such that an electrical signal is produced for substantially each predetermined increment of relative displacement of the Hall sensor and the ferromagnetic poles along said predetermined path.

3. A pulse generator according to claim 1 wherein the magnetic field generator means comprises a rotor having said first plurality of ferromagnetic poles in an annular arrangement thereon for movement relative to the Hall sensor.

4. A pulse generator according to claim 3 wherein the rotor comprises an annular permanent magnet axially magnetized to provide opposite poles on opposite axial ends thereof and pole plates on opposite axial ends of the circular magnet having said first plurality of ferromagnetic poles.

5. A pulse generator according to claim 4 wherein the pole plates have the same number of equiangularly spaced poles.

6. A pulse generator according to claim 5 wherein the poles of the pole plates are angularly offset such that the poles of each plate are substantially midway between adjacent poles of the other plate.

7. A pulse generator according to claim 1 wherein the bistable magnetic circuit means comprises a bistable ferromagnetic shunt associated with the Hall sensor having a second plurality of ferromagnetic poles along said predetermined path cooperable with said first plurality of ferromagnetic poles to be magnetically switched back and forth between said two alternative stable magnetic states to apply said alternating magnetic field to the Hall sensor upon relative displacement of the first and second ferromagnetic poles along said predetermined path.

8. A pulse generator according to claim 7 wherein the ferromagnetic shunt is generally E-shaped with a center leg associated with the Hall sensor and a pair of outer legs, the center and outer legs having said second plurality of ferromagnetic poles cooperable with said first plurality of ferromagnetic poles to magnetically switch the shunt back and forth between said two alternative stable magnetic states to apply said alternating magnetic field through the center leg to the Hall sensor.

9. A pulse generator according to claim 7 wherein the bistable magnetic circuit means further comprises magnet means mounted in spaced relationship with said second plurality of ferromagnetic poles of the ferromagnetic shunt and such that the first plurality of ferromagnetic poles pass therebetween to magnetically switch the shunt back and forth between said two alternative stable magnetic states to produce an alternating magnetic field in the ferromagnetic shunt.

10. A pulse generator according to claim 9 wherein said magnet means comprises a third plurality of ferromagnetic poles in spaced relationship with said second plurality of ferromagnetic poles respectively such that the first plurality of ferromagnetic poles pass therebetween to magnetically switch the shunt back and forth between its said alternative stable magnetic states to produce an alternating magnetic field in the ferromagnetic shunt.

11. A rotary electrical pulse generator comprising a rotor with a pair of coaxial permanent magnet rings having an annular air gap between the inner axial sides thereof, each magnet ring having an annular arrangement of a plurality of contiguous axially extending and axially inwardly pointing generally U-shaped magnetic circuits, the adjacent U-shaped magnetic circuits of each magnet ring having contiguous poles of like polarity forming a joint magnetic pole of higher magnetic intensity and the U-shaped magnetic circuits of each magnet ring providing an even plurality of substantially equiangularly spaced joint magnetic poles of alternating magnetic polarity on the inner axial side thereof, the pair of coaxial magnet rings having their respective joint magnetic poles in substantially axially aligned magnetic attraction whereby an annular arrangement of a plurality of generally oval contiguous magnetic circuits is formed by the pair of coaxial magnet rings to produce an annular alternating magnetic field in the annular air gap therebetween having axially extending magnetic fields between the joint poles and sharp magnetic field reversal, and magnetically responsive pickup means mounted in the annular air gap between the magnet rings to be acted upon by the alternating magnetic field to generate substantially equally spaced electrical signals as the rotor rotates.

12. A pulse generator according to claim 11, wherein the magnet rings are annular permanent magnets each magnetized to form said U-shaped magnetic circuits.

13. A pulse generator according to claim 11 wherein each magnet ring comprises a ferromagnetic ring with a plurality of angularly spaced axially extending ferromagnetic pole pieces and permanent magnet segments between the ferromagnetic pole pieces having axially extending magnetic axes generally parallel to the ferromagnetic pole pieces such that the permanent magnet segments and ferromagnetic ring of each magnet ring together form its said U-shaped magnetic circuits.

14. A pulse generator according to claim 11 wherein the pickup means comprises a plurality of substantially equiangularly spaced magnetically responsive pickups along a portion of said annular air gap no greater than the spacing between joint adjacent magnetic poles of like polarity.

* * * * *